June 23, 1953 K. W. HALLDEN 2,642,938
ROTARY MISS-CUT SHEARS
Filed July 30, 1949 3 Sheets-Sheet 3

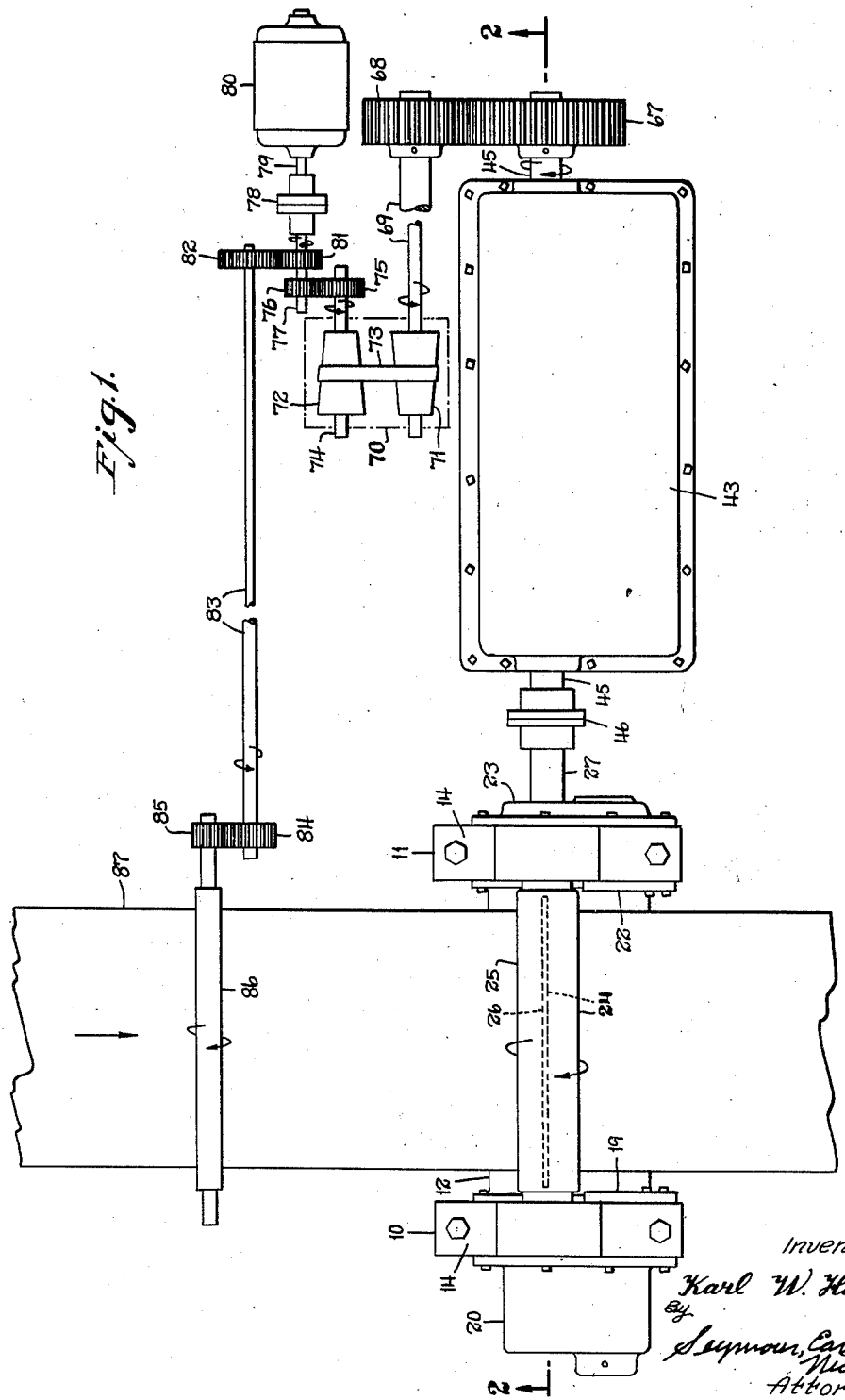

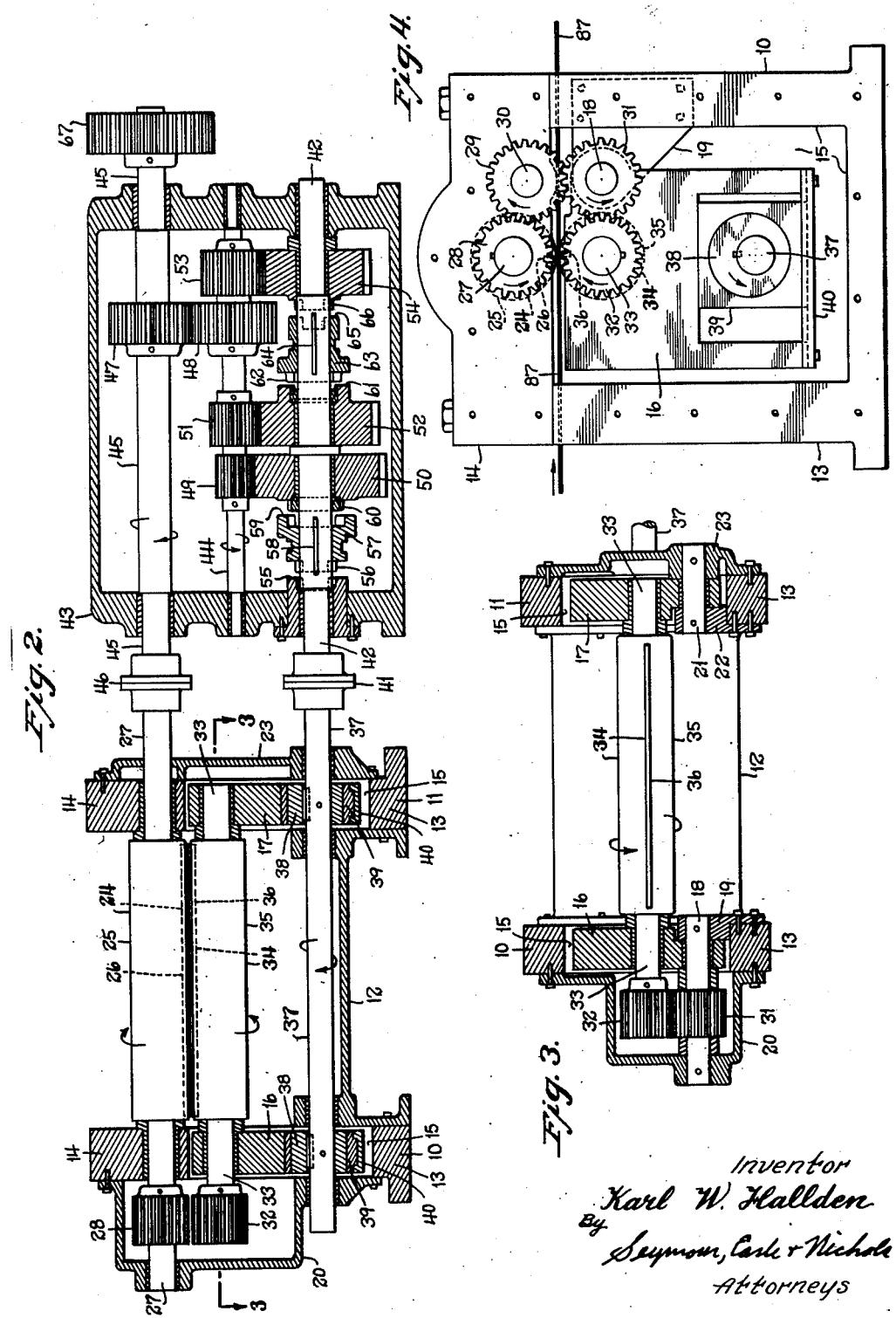

Inventor
Karl W. Hallden
By
Seymour, Earle & Nichols
Attorneys

Patented June 23, 1953

2,642,938

UNITED STATES PATENT OFFICE 2,642,938

ROTARY MISS-CUT SHEARS

Karl W. Hallden, Thomaston, Conn.

Application July 30, 1949, Serial No. 107,713

1 Claim. (Cl. 164—68)

The present invention relates to improvements in rotary shears and relates more particularly to rotary shears having a construction and arrangement of parts whereby the rotary cutting-members may be caused to miss performing a cutting operation during one or more of their revolutions, to thus permit the cutting of long strips of sheet materials into units of various lengths.

Rotary shears of the type above referred to are employed for cutting various materials, among which uses may be mentioned that of transversely cutting long lengths or strips of sheet metal, paper and the like, into individual sheets of desired sizes.

One of the main objects of the present invention is to provide a superior rotary miss-cut shear combining accuracy of operation with freedom from derangement.

Another object of the present invention is to provide a rotary shear of the character referred to having a superior construction and arrangement of parts whereby one of the complemental rotary cutter-units may be laterally shifted toward and away from the other cutter-unit to avoid a cutting action when desired, while still maintaining the two said cutter-units accurately interconnected and synchronized.

A further object of the present invention is to provide a superior miss-cut shear wherein the two rotary cutter-units are interconnected by a gear-train, and in which one of the said cutter-units may be laterally shifted toward and away from the other cutter-unit without so shifting any of the members of the said gear-train so that they fail to intermesh substantially on their respective pitch-lines.

Still another object of the present invention is to provide a superior rotary shear of the character referred to which, while having relatively-displaceable complemental rotary cutter-units, will still effectively cut sheet metal or the like even though the actual cutting operation should occur while one of the said rotary cutter-units is moving bodily toward the other.

Still another object of the present invention is to provide a superior rotary miss-cut shear having minimum susceptibility to chattering under the normal strains imposed during the actual cutting operation.

With the above and other objects in view, as will appear to those skilled in the art from the present disclosure, this invention includes all features in the said disclosure which are novel over the prior art.

In the accompanying drawings, in which certain modes of carrying out the present invention are shown for illustrative purposes:

Fig. 1 is a schematic top or plan view of a rotary miss-cut shear embodying the present invention and with the cutter-units shown as co-operating to effect the transverse cutting of the strip of sheet-material;

Fig. 2 is a vertical sectional view taken on the line 2—2 of Fig. 1;

Fig. 3 is a broken horizontal sectional view taken on the line 3—3 of Fig. 2;

Fig. 4 is a broken view in side elevation with the end-cover removed;

Figure 5:
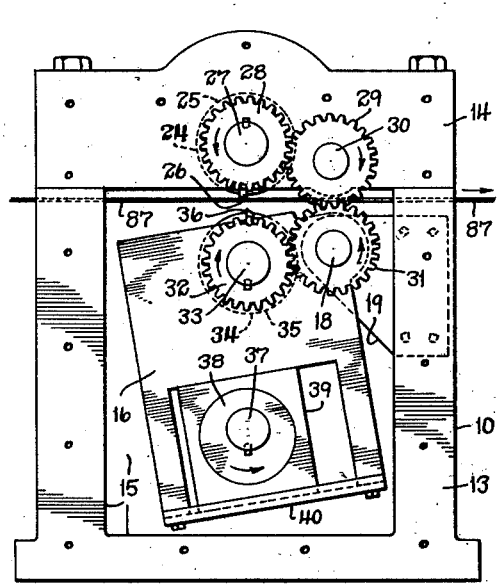
Fig. 5 is a view similar to Fig. 4 but showing the parts in the positions which they assume during a cut-missing phase of operation.

The structure of Figs. 1 to 8 inclusive

The structure shown in the figures referred to includes two laterally-spaced-apart frame-units respectively generally designated by the reference characters 10 and 11 and rigidly held in spaced relationship by a spacing-member 12, as is especially well shown in Fig. 2.

Each frame-unit 10 and 11 comprises a substantially U-shaped lower frame-member 13 having the upper ends of its arms surmounted and interconnected by a cap 14, as is especially well shown in Figs. 4 and 5. The U-shaped frame-member 13 and its complemental cap 14 of each frame-unit 10 and 11 as thus shaped and assembled provide a substantially-rectangular opening 15 in each of the said frame-units.

Accommodated in the opening 15 of the frame-unit 10 is a plate-like cutter-carrier 16 and similarly accommodated in the opening 15 of the frame-unit 11 is a plate-like cutter-carrier 17, as may be readily seen by reference to Figs. 2 and 3. The cutter-carrier 16 is mounted for turning movement adjacent its forward upper corner upon a shaft 18 around which the said cutter-carrier is adapted to swing in a manner as will hereinafter appear. The inner end of the shaft 18 is supported in and secured to a bracket 19 which, in turn, is fastened to the forward leg of the adjacent U-shaped frame-member 13. The outer end of the shaft 18 is supported in and rigidly connected to an end-cover 20 secured to the outer face of the frame-unit 10, as is particularly well shown in Figs. 2 and 3.

The cutter-carrier 17 is mounted for turning movement adjacent its forward upper corner upon a shaft 21. The said shaft 21 is arranged in axial alignment with the shaft 18 and has its inner end supported in and rigidly connected to a bracket 22 secured to the inner face of the adjacent portion of the frame-member 13 as is especially well shown in Fig. 3. The cutter-carrier 17 is adapted to swing about the shaft 21 as a center, all for purposes as will hereinafter appear. The outer end of the shaft 21 is secured to and supported in an end-cover 23 rigidly attached to the outer face of the frame-unit 11, as is shown in Figs. 2 and 3.

Supported for rotation at its respective opposite ends in the caps 14—14 of the respective frame-units 10 and 11, is an upper cutter-unit generally designated by the reference character 24. The said cutter-unit includes a drum 25, a cutting-blade 26 and a shaft 27 to which the said drum is rigidly coupled in any suitable manner and from both of the respective opposite ends of which latter the said shaft 27 projects, as is especially well shown in Fig. 2. The cutting-blade 26 is mounted in the outer surface of the drum 25 so as to project beyond the periphery, for purposes as will hereinafter appear. Preferably, the said cutting-blade 26 is of such character as will permit its ready removal and replacement with respect to the drum 25.

The projecting end of the shaft 27 which rotates in the cap 14 of the frame-unit 10 also turns in the end-cover 20 and has rigidly mounted upon it a gear-wheel 28 meshing into and driving a gear-wheel 29 mounted for rotation upon the shaft 30 supported by the adjacent cap 14. The gear-wheel 29 is located forwardly of the gear-wheel 28 and in turn meshes into and drives a gear-wheel 31 located below it and freely rotating on the shaft 18 upon which the cutter-carrier 16 is also mounted for swinging movement as is especially well shown in Figs. 4 and 5. In turn, the gear-wheel 31 just referred to meshes into and drives a gear-wheel 32 rigidly mounted upon the adjacent end of a shaft 33 which will be presently described.

The shaft 33 is located below and in substantial parallelism with the shaft 27 and bears at its respective opposite ends in the cutter-carriers 16 and 17 as is especially well shown in Figs. 2 and 3. The said shaft 33 forms a feature of a lower cutter-unit generally designated by the reference character 34 and which also includes a drum 35 rigidly mounted upon the shaft 33 and in turn carrying in its outer surface a cutting-blade 36 adapted to cooperate with the cutting-blade 26 previously described.

The gear-wheel 32 above described does not mesh into the gear-wheel 28 and turns in a direction oppositely with respect thereto as is indicated in Fig. 4. The said gear-wheel 32 together with the entire cutter-unit 34, moves bodily around the shafts 18 and 21 as a common center when the cutter-carriers 16 and 17 are swung in a manner as will be hereinafter described.

For the purpose of concurrently rocking the cutter-carriers 16 and 17 to advance and retire the cutter-unit 34 into and out of cooperative relationship with respect to the cutter-unit 24, there is provided a shaft 37 journaled for rotation adjacent its respective opposite ends in the spacing-member 12 (Fig. 2) and projecting at its opposite ends through the end-covers 20 and 23. Respectively in registration with the cutter-carriers 16 and 17, the shaft 37 has rigidly mounted thereon two similar cutter-shifting eccentrics 38—38. Each eccentric 38—38 fits within one of two similar slide-blocks 39—39 respectively mounted with capacity for sliding movement in a substantially-horizontal direction in the forked lower portions of the cutter-carriers 16 and 17. Each slide-block 39 is retained in place and guided for reciprocating movement in the direction specified by means of one of two retaining-plates 40—40 respectively secured to the under surfaces of the cutter-carriers 16 and 17.

At its projecting end adjacent the cutter-carrier 17, the shaft 37 above referred to is connected by means of a coupling 41 to a lower shaft 42 extending coaxially with respect thereto and journaled adjacent its respective opposite ends in a gear-train housing 43, as is indicated in Fig. 2.

Also journaled in the respective opposite ends of the housing 43 is an intermediate shaft 44 located above and extending in parallelism with the shaft 42. Located in turn above the shaft 44 is a main shaft 45 also journaled adjacent its respective opposite ends in the housing 43 and extending in parallelism with both of the shafts 42 and 44 and arranged in axial alignment with the shaft 27 of the upper cutter-unit 24 and connected thereto by a coupling 46. The main shaft 45 not only directly drives the upper cutter-unit 24 but also drives the shaft 37 upon which the eccentrics 38—38 are mounted at various speed-ratios, in a manner as will hereinafter appear.

In the particular instance shown, the main shaft 45 has rigidly mounted upon it within the casing 43, a gear-wheel 47 meshing into and driving a gear-wheel 48 in turn rigidly mounted upon the intermediate shaft 44 preferably in such manner that the latter shaft rotates once for each revolution of the main shaft 45. The intermediate shaft 44 has rigidly mounted upon it a gear-wheel 49 which meshes into and drives a gear-wheel 50 mounted with freedom for rotation upon the lower shaft 42, but held against axial displacement with respect thereto. In the present instance, the gear-wheels 49 and 50 are so proportioned that the latter gear-wheel rotates at one-quarter the speed of the gear-wheel 49 and hence one-quarter the speed of the main shaft 45.

The intermediate shaft 44 within the gear-train housing 43 also has rigidly secured to it a gear-wheel 51 meshing into and driving a gear-wheel 52 mounted with freedom for rotation upon the lower shaft 42 but held thereon against axial displacement. In the instance shown, the respective diameters of the gear-wheels 51 and 52 are such that the latter gear-wheel makes but one-third revolution for each full revolution of the mating gear-wheel 51.

Adjacent its outer end, the intermediate shaft 44 has rigidly mounted upon it a gear-wheel 53 meshing into and driving a gear-wheel 54 mounted upon the lower shaft 42 for rotation relative thereto but stabilized against axial displacement. In the instance shown, the gear-wheels 53 and 54 are so related that the latter will be driven at one-half the speed of the gear-wheel 53.

On its inner face adjacent the cutter-units 24 and 34, the gear-train housing 43 is provided with fixed clutch-teeth 55 surrounding the adjacent end of the lower shaft 42 and designed and adapted to be engaged by clutch-teeth 56 formed on the adjacent end of a tubular clutch-member 57. The clutch-member 57 is mounted upon the shaft 42 with freedom for sliding movement in an axial direction but is held against rotation relative to the said shaft by a key 58.

At its right end (as viewed in Fig. 2), the sliding clutch-member 57 is formed with clutch-teeth 59 which are adapted to be engaged with clutch-teeth 60 formed on the adjacent side of the gear-wheel 50.

On its right side (as viewed in Fig. 2) the gear-wheel 52 is formed with clutch-teeth 61 adapted to be engaged by clutch-teeth 62 formed on the adjacent end of a sliding tubular clutch-member 63. The said clutch-member is mounted upon the lower shaft 42 with capacity for sliding movement axially with respect thereto but held against relative rotation by means of a key 64.

At its end adjacent the gear-wheel 54 the clutch-member 63 is provided with clutch-teeth 65 adapted to be interengaged with clutch-teeth 66 formed on the adjacent face of the gear-wheel 54.

Exterior of the gear-train housing 43 and at its end remote from the cutting-units 24 and 34 the main shaft 45 has rigidly mounted thereon a gear-wheel 67 which meshes into and is driven by a gear-wheel 68 rigidly mounted upon a shaft 69 as is indicated in Fig. 1. At its end remote from the gear-wheel 68 the said shaft 69 extends into a speed-changing unit generally designated by the reference character 70. The said speed-changing unit may be of any of the well-known forms common in the art and providing for an infinite number of speed changes within their rated capacities. In the instance shown, the shaft 69 has mounted upon it a cone 71 driven by a reversely-tapering complemental cone 72 through the intermediary of a laterally-shiftable belt 73. The last mentioned cone 72 is mounted upon a shaft 74 which in turn carries a gear-wheel 75. The gear-wheel 75 meshes into and is driven by a gear-wheel 76 mounted upon a drive-shaft 77 extending axially with respect to and connected by means of a coupling 78 to a motor-shaft 79 as is indicated in Fig. 1. The shaft 79 forms a feature of an electric motor or other suitable prime-mover 80.

In addition to its gear-wheel 76 the drive-shaft 77 also has rigidly mounted upon it a gear-wheel 81 meshing into and driving a gear-wheel 82 in turn rigidly mounted upon a feed-shaft 83. At its end, remote from the gear-wheel 82, the feed-shaft 83 has rigidly mounted upon it a gear-wheel 84 which meshes into and drives a gear-wheel 85 connected to and driving a feed-roll 86. The said feed-roll extends transversely above the strip or length of sheet-material indicated at 87 and which it is desired to sever into a plurality of individual sheets. The feed-roll 86 may form a feature of any suitable feed mechanism serving to feed the sheet-material 87 between the complemental upper and lower cutter-units 24 and 34 and requires no detailed illustration or description therein.

*The operation of the structure of Figs. 1 to 8 inclusive*

For purposes of description, let it be assumed that the motor 80 is energized and is therefore rotating the feed-roll 86 to move the sheet-material 87 in the direction indicated and that the said motor is also driving the main shaft 45. The main shaft 45 under the present circumstances will directly drive the upper cutter-unit 24 and in turn the interconnecting train of gears 28, 29, 31 and 32 will effect the rotation of the lower cutter-unit 34 in synchronism with the upper cutter-unit 24 regardless of whether or not the two said cutter-units are laterally toward each other or laterally away from each other or at any intermediate position. During their rotary movements, the respective cutting-blades 26 and 36 will always occupy the same positions relative to the sheet-material though they will coact to effect a cut only when the lower cutter-unit 34 is moved laterally upwardly toward the upper cutter-unit 24 into the position indicated in Figs. 2, 3 and 4 of the drawings.

If it is desired to have the cutter-units 24 and 34 effect a severing of the sheet-material 87 once during each revolution of the said cutter-units, the shaft 37 will be turned until the eccentrics 38—38 are in their uppermost positions as indicated in Fig. 4. The said eccentrics may be locked in this position by moving the clutch-member 57 from the right to left (as viewed in Fig. 2) to engage its clutch-teeth 56 with the stationary clutch-teeth 55 of the housing 43 whereupon the shaft 42, the shaft 37 and the eccentrics 38—38 will be locked against rotation. Under these circumstances, the cutting-blades 26 and 36 will coact once for each revolution of the drums 25 and 35 to transversely sever the sheet-material 87 as the said material is fed between the two cutter-units by the feed-roll 86 or its equivalent.

Figures 6, 7, 8:
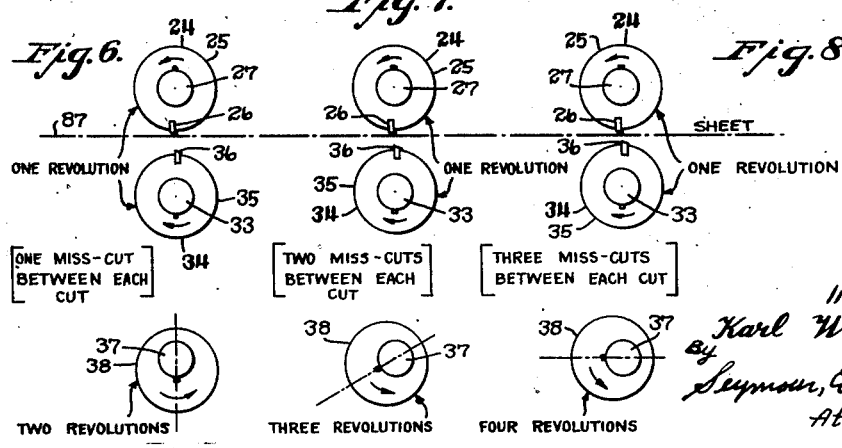
Fig. 6 is a schematic view indicating the relationship of the cutter-units and cutter-shifting eccentric when the parts are adjusted to effect a cut for each two revolutions of the said cutter-units.
Fig. 7 is a view similar to Fig. 6 but indicating the relationship of the cutter-units and cutter-shifting eccentric when the parts are adjusted to effect a cut for each three revolutions of the cutter-units.
Fig. 8 is a view similar to Figs. 6 and 7 but indicating the relationship of the cutter-units and cutter-shifting eccentric when the parts are adjusted to effect a cut for each four revolutions of the cutter-units.

Now let it be assumed that it is desired to cut off sheets somewhat longer than was the case when the cutter-units 24 and 34 coacted once for each revolution thereof. With this objective in mind, the clutch-member 57 may be moved into the position in which it is shown in Fig. 2 and the clutch-member 63 may be moved from left to right (Fig. 2) to engage its clutch-teeth 65 with the clutch-teeth 66 of the gear-wheel 54. Under these conditions, the said gear-wheel 54 will be coupled to and will drive the shaft 42 one-half revolution for each revolution of the main shaft 45 or in other words, one revolution for each two revolutions of the said main shaft as schematically indicated in Fig. 6.

Under the conditions just above described, the eccentrics 38—38 will have swung the cutter-carriers 16 and 17 down to their lower limits when the cutter-blades 26 and 36 are in registry during one revolution of the cutter-units 24 and 34 (Figs. 5 and 6) to thus miss the cutting of the sheet at this time, though when the said blades register on the next successive revolution of the cutter-units 24 and 34 the eccentrics 38—38 will by that time have restored the lower cutter-unit 34 into the position in which it is indicated in Fig. 4 and thereby cause the cutting-blades 26 and 36 to cooperate to sever the sheet-material 87.

Should it be desired to cause the cutter-units 24 and 34 to effect the severing of the sheet-material 87 only on each third revolution to thereby produce still longer sheet-units, the clutch-member 57 may be left in the position in which it is indicated in Fig. 2 and the clutch-member 63 moved from right to left (as viewed in Fig. 2) to engage its clutch-teeth 62 with the clutch-teeth 61 of the gear-wheel 52. Under these conditions, the gear-wheel 52 will be rigidly coupled to the shaft 42 and hence to the shaft 37 and will effect the rotation of the cutter-shifting eccentrics 38—38 at the rate of one-third revolution for each full revolution of the main shaft 45 or in other words, at the rate of one revolution for each three revolutions of the said main shaft as is schematically represented in Fig. 7.

Under the conditions just above described, the cutting-blades 26 and 36 will be in position to cooperate only for once each three revolutions of the cutter-units 24 and 34 and hence the cut-off sheets will be longer than under the previous settings described.

Now let it be assumed that it is desired to have the cutting-blades 26 and 36 cooperate only once during each four revolutions (three miss-cuts) of the cutter-units 24 and 34, the clutch-member 63 should be moved into the position in which it is indicated in Fig. 2 and the clutch-member 57 moved from left to right from its position indicated in Fig. 2. The described movement of the clutch-member 57 will engage its clutch-teeth 59 with the clutch-teeth 60 of the gear-wheel 50 thereby rigidly coupling the latter to the shaft 42 and hence also to the shaft 37 and the eccentrics 38—38. Under these conditions, the shaft 42 and hence the eccentrics 38—38 will turn only one-quarter revolution for each full revolution of the main shaft 45 or in other words, the eccentrics 38—38 will turn at the rate of only one revolution for each four revolutions of the main shaft 45 and hence of the cutter-units 24 and 34.

Under the conditions just above described, the lower cutter-unit 34 will be sufficiently away from the upper cutter-unit 24 to avoid the coaction of the cutting-blades 26 and 36 during three full revolutions of the said cutter-units and the said blades will coact to effect a cutting operation only once in each four revolutions of the said cutter-units.

From the foregoing it will be apparent that the shifting of the clutch-members 57 and 63 as described changes only the rate of movement between the rotary cutter-units 24 and 34 on the one hand and the cutter-shifting eccentrics 38—38 on the other hand.

The rotary speeds of the cutter-units 24 and 34 relative to the linear speed of the strip of sheet-material 87 may be conveniently altered by shifting the belt 73 of the speed-changing unit 70, in a manner well known in the art.

When the cutter-carriers 16 and 17 are swung to advance and retire the cutter-unit 34 with respect to the cutter-unit 24, the gear-wheel 32 will, of course, move bodily with the said cutter-carriers but will move in a path concentric with respect to the axis of rotation of the gear-wheel 31 and hence the accurate pitch-line mesh between the two gears 32 and 31 will not be disturbed regardless of the position of the said cutter-carriers 16 and 17.

It will also be observed from Fig. 4 that the rotary axis of the eccentrics 38 lies in, or substantially in, the plane in which the rotary axes of the cutter shafts 27 and 33 lie. In thus coordinating the eccentrics 38 with the cutter shafts 27 and 33, and by having the eccentrics 38 drive the slide blocks 39 in the carriers 16 and 17, respectively, the rocking forces imparted by these eccentrics to these carriers as well as the very considerable reacting shear forces of the blade 36 are only to a negligible extent transmitted to the pivot shafts 18 and 21 of the carriers 16 and 17, respectively, wherefore these pivot shafts are hardly subjected to bending stresses and their bearings show little wear even after a long time of use. This freedom from wear of the bearings of the pivot shafts 18 and 21, in conjunction with the lack of appreciable bending stresses in these pivot shafts, go far toward preventing appreciable wear of the meshing gears 28, 29, 31 and 32 over a long period of time. Further, the rocking forces imparted by the eccentrics 38 to the carriers 16 and 17 and the very considerable reacting shear forces of the blade 36 set up only compressive stresses in these carriers between the cutter shaft 33 and the slide blocks 39, and these compressive stresses are entirely harmless. Accordingly, only the cutter shafts 27 and 33 and the eccentrics carrying shaft 37 and their respective bearings are subjected to considerable stresses, and these may readily be constructed to withstand these stresses successfully for a long period of use.

Figure 9:
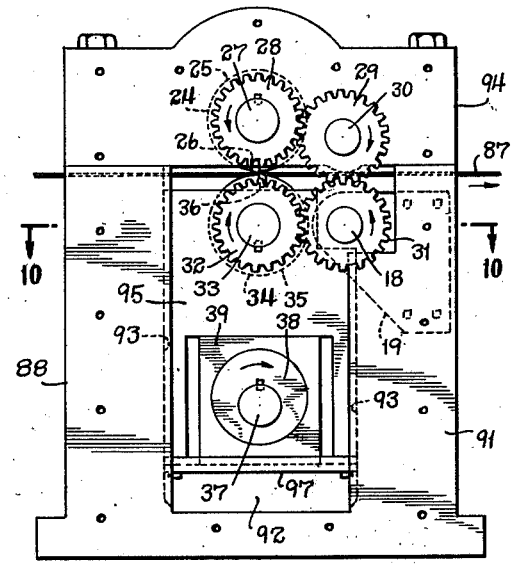
Fig. 9 is a view in side elevation similar to Fig. 4 but showing a modified form of the present invention.
Figure 10:
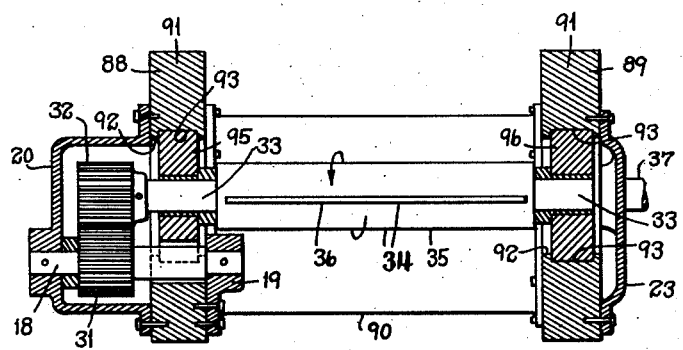
Fig. 10 is a horizontal sectional view taken on the line 10—10 of Fig. 9.

The structure of Figs. 9 and 10

The rotary miss-cut shear illustrated in Figs. 9 and 10 is basically the same as the previously-described rotary miss-cut shear, though differing in some details. The same upper and lower cutter-units 24 and 34 are employed as well as other similar parts all of which will bear reference characters corresponding to those employed in connection with the description of the first-described structure.

Like the preceding structure, the structure of Figs. 9 and 10 includes two laterally-spaced-apart frame-units respectively generally designated by the reference characters 88 and 89 rigidly held in spaced relationship by a spacing-member 90 indicated in Fig. 10.

Each frame-unit 88 and 89 includes a substantially U-shaped lower frame-member 91 similar to the previously-described frame-member 13 save that its substantially-rectangular opening 92 is of a lesser width than the previously-described opening 15. Furthermore, the lower frame-member 91 is formed in each of the respective opposite sides of its opening 92 with one of two similar guide-grooves 93—93. Secured to and extending across the otherwise open upper end of the lower frame-member 91 is a cap 94 similar to the previously-described cap 14.

Mounted for vertical reciprocation in the respective guide-grooves 93—93 of the lower frame-members 91—91, is one of two similar plate-like cutter-carriers 95 and 96. The inverted U-shaped lower portion of each cutter-carrier 95 and 96 receives one of the two similar slide-blocks 39—39 previously described. Each of the said slide-blocks is retained in place and guided for reciprocating movement in a substantially-horizontal direction by a retaining-plate 97 rigidly secured to the under surface of the cutter-carrier in which the given slide-block 39 is mounted.

The turning movement of the shaft 37 will cause the cutter-carriers 95 and 96 to reciprocate vertically to advance and retire the lower cutter-unit 34 toward and away from the upper cutter-unit 24 to effect the same results described in connection with the structure of Figs. 1 to 8 inclusive.

In the structure now being described, the series of gear-wheels 28, 29, 31 and 32 are meshed in series in the same manner previously described and will remain so meshed despite the movement of the cutter-carriers 95 and 96. Instead, however, of the gear-wheel 32 swinging about the axis of the gear-wheel 31, it moves in a path substantially perpendicular with respect to a line drawn between the respective centers of the two said gears. Due to the four gear series described, the movement of the gear-wheel 32 relative to the gear-wheel 31 is so relatively slight that it does not change the correct pitch-line meshing of the two said gears to a harmful extent.

The invention may be carried out in other specific ways than those herein set forth without departing from the spirit and essential characteristics of the invention, and the present embodiments are, therefore, to be considered in all respects as illustrative and not restrictive, and all changes coming within the meaning and equivalency range of the appended claim are intended to be embraced therein.

I claim:

In a cutting device, the combination of a frame; two first shafts supported by said frame in spaced relation to each other; a carrier pivotally mounted on a certain one of said first shafts; two cutter shafts of which a certain one is journaled in said carrier and the other in said frame, said shafts being parallel to each other and arranged in two sets of which one set is formed by said certain shafts and the shafts of each set are equally spaced from each other, said cutter shafts being provided with peripheral shear blades, respectively, having shear edges equally radially spaced from the axes of their respective cutter shafts, and said carrier being rockable to and from said other cutter shaft into and from a cutting position in which the blades are in shearing relation if they are in shearing alignment; two permanently meshing identical first gears on said first shafts, respectively; two identical second gears mounted on said cutter shafts, respectively, and in permanent mesh with the adjacent first gears, respectively, said second gears being smaller in radius than the radial distances of said shear edges from the axes of the respective cutter shafts; a guideway on said carrier extending parallel to the plane in which the axes of the shafts of said one set lie; a slide block movable in said guideway; a drive shaft journaled in fixed bearings and carrying an eccentric rotatably received in said slide block, the axis of said drive shaft lying in the plane in which the rotary axes of said cutter shafts lie when said carrier is substantially in its cutting position; and a change speed drive having an input shaft and a variable speed output shaft of which said input shaft is drivingly connected with one of said gears to bring said blades into periodic shearing alignment with each other, and said output shaft is drivingly connected with said drive shaft to achieve different numbers of miss-cuts by said blades between successive cutting actions thereof.

KARL W. HALLDEN.

References Cited in the file of this patent

UNITED STATES PATENTS

| Number | Name | Date |
|---|---|---|
| 1,031,056 | Edwards | July 2, 1912 |
| 1,969,433 | Smitmans | Aug. 7, 1934 |
| 1,984,913 | Biggert | Dec. 18, 1934 |
| 1,988,215 | Peterson | Jan. 15, 1935 |
| 2,017,366 | Kling | Oct. 15, 1935 |
| 2,190,638 | Talbot | Feb. 13, 1940 |

FOREIGN PATENTS

| Number | Country | Date |
|---|---|---|
| 257,278 | Great Britain | Aug. 4, 1927 |
| 594,340 | Germany | Mar. 15, 1934 |